United States Patent [19]

Vengsarkar

[11] Patent Number: 5,416,863
[45] Date of Patent: May 16, 1995

[54] MODE-FIELD TRANSFORMING OPTICAL WAVEGUIDE

[75] Inventor: Ashish M. Vengsarkar, Allentown, Pa.

[73] Assignee: AT&T Corp., Murray Hill, N.J.

[21] Appl. No.: 176,362

[22] Filed: Dec. 30, 1993

[51] Int. Cl.$^6$ .................................. G02B 6/26
[52] U.S. Cl. ................... 385/28; 385/124; 359/653
[58] Field of Search ............ 385/14, 28, 29, 123, 385/124, 129, 130, 132, 141, 142, 144; 359/652, 653; 250/227.24; 65/3.11, 4.2

[56] References Cited

U.S. PATENT DOCUMENTS

| | | | |
|---|---|---|---|
| 4,212,660 | 7/1980 | Maurer | 385/124 |
| 4,578,096 | 3/1986 | Siegmund | 385/124 |
| 4,650,992 | 3/1987 | Ruhrmann | 250/227.11 |
| 4,697,868 | 10/1987 | Thaniyavarn | 385/11 |
| 4,758,071 | 7/1988 | McLaughlin et al. | 359/653 |
| 4,839,527 | 6/1989 | Leitch | 250/573 |
| 4,936,681 | 6/1990 | Ruhrmann | 250/227.25 |
| 5,166,827 | 11/1992 | Noda | 359/653 |

OTHER PUBLICATIONS

J. Armitay et al., "Optical Fiber Tapers—A Novel Approach to Self-Aligned Beam Expansion and Single-Mode Hardware" *J. Lightwave Technol.* LT-5, No. 1, pp. 70-76 (Jan. 1987).

K. P. Jedrzejewski, "Tapered-Beam Expander For Single-Mode Optical-Fibre GAP Devices", *Electronics Letters*, 22, No. 2 pp. 105-106 (16 Jan. 1986).

S. Kosinski, et al., "Low-loss (ap0.15 dB) arc fusion splicing of erbium-doped fibers with high strength (ap400 ksi) for highly reliable optical amplifier systems" *Proc. Optical Fiber Communications Conf. OFC)*, Paper Th16, 231 (2-7 Feb. 1992).

*Primary Examiner*—Frank Gonzalez
*Attorney, Agent, or Firm*—Glen E. Books

[57] ABSTRACT

In accordance with the invention, a mode-field transforming waveguide region comprise an elongated glass core surrounded by glass cladding wherein the normalized index differential between the cladding and the core (termed $\Delta$) varies along the length. Preferably the waveguide comprises an optical fiber having a hydrogen-loaded germanosilicate core. The variation of $\Delta$ as a function of longitudinal distance can be effected by exposing the fiber to ultraviolet light and varying the dosage of exposure as a function of longitudinal distance.

8 Claims, 1 Drawing Sheet

MODE-FIELD TRANSFORMING OPTICAL WAVEGUIDE

FIELD OF THE INVENTION

This invention relates to optical waveguiding structures and, in particular, to waveguiding structures, such as optical fibers, especially adapted for transforming an optical beam of a first modal spot size to a beam of a second modal spot size.

BACKGROUND OF THE INVENTION

As optical fiber communications systems proliferate, the problem of interconnecting optical components having unequal modal spot sizes assumes increasing importance. Such interconnections are required in a variety of circumstances including: 1) the interconnection of laser sources to fibers, 2) the interconnection of two fibers having dissimilar modal properties, and 3) the interconnection of fibers to waveguides and waveguides to fibers. Such interconnections have been an area of active research, and a variety of approaches have been developed. For example, pre-tapered preforms have been prepared to draw tapered regions for connecting lasers to fibers. J. Armitay et al., *J. Lightwave Technol.* LT-5, 70 (1987). Fibers have been tapered through capillaries in order to achieve beam-expansion. K. P. Jedrzejewski, 22 *Electron. Lett.* 106 (1986) and fiber cores have been thermally expanded for splicing dissimilar fibers. S. G. Kosinski et al., *Proc. Optical Fiber Communications Conference OFC*, Paper Th16, 231 (1992). These techniques, however, all depend on control of the physical dimensions of the fiber core-a control which is difficult and expensive to achieve. Accordingly, there is a need for improved waveguiding structures for transforming an optical beam of a first modal spot size to a beam of a second modal spot size.

SUMMARY OF THE INVENTION

In accordance with the invention, a mode-field transforming waveguide region comprises an elongated glass core surrounded by glass cladding wherein the normalized index differential between the cladding and the core (termed $\Delta$) varies along the length. Preferably the waveguide comprises an optical fiber having a hydrogen-loaded germanosilicate core. The variation of $\Delta$ as a function of longitudinal distance can be effected by exposing the fiber to ultraviolet light and varying the dosage of exposure as a function of longitudinal distance.

BRIEF DESCRIPTION OF THE DRAWINGS

The advantages, nature and various additional features of the invention will appear more fully upon consideration of the illustrative embodiments now to be described in detail in connection with the accompanying drawings. In the drawings.

It is to be understood that these drawings are for purposes of illustrating the concepts of the invention and, except for graphical illustrations, are not to scale.

DETAILED DESCRIPTION

Figure 1:
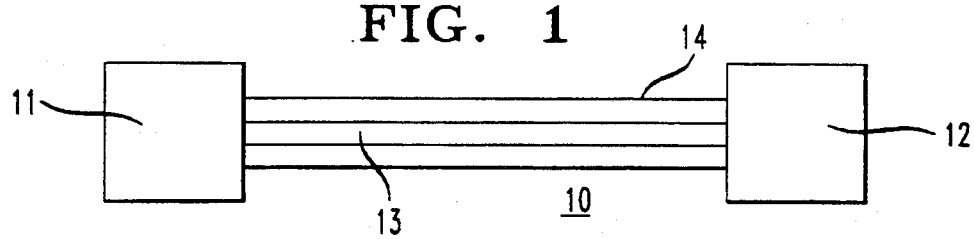
FIG. 1 is a schematic cross section of a mode-field transforming optical waveguide interconnecting optical components having different modal spot sizes.

Referring to the drawings, FIG. 1 is a schematic cross section of a mode-field transforming optical waveguide 10 interconnecting generalized optical components 11 and 12 having different modal spot sizes. Elements 11 and 12 can be any optical components that transmit optical beams in modes such as lasers and waveguides including optical fibers. Preferably waveguide 10, which can be in the form of an optical fiber, comprises a length of glass waveguide core 13 peripherally surrounded by cladding 14. The index of refraction of core ($N_1$) is larger than that of the cladding. ($N_2$). In accordance with the invention, the normalized index differential $$\left(\Delta = \frac{N_1 - N_2}{N_1}\right)$$

varies as a function of distance x along the length of the waveguide in order to match the modal spot sizes of components 11 and 12. For example, if component 11 transmits an optical beam of larger modal spot size than component 12, transforming waveguide 10 is provided with a longitudinal index differential variation tailored to reduce the modal spot size of component 11 to that of component 12 as the beam passes through 10 into 12.

Figure 2:
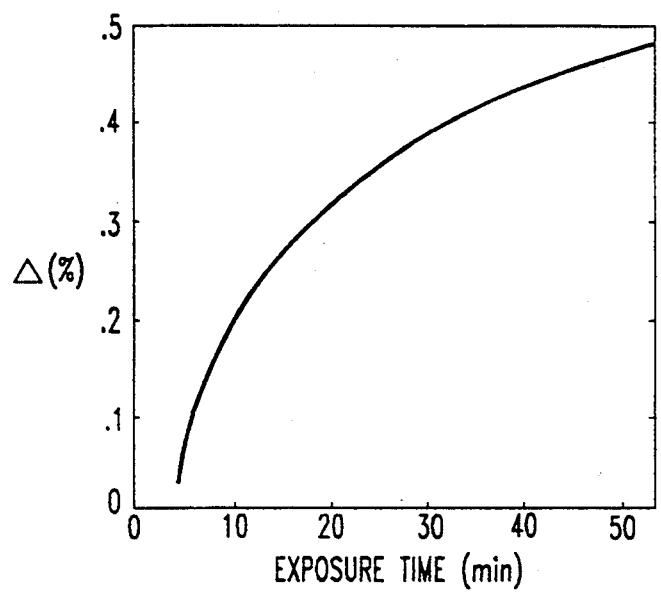
FIG. 2 is a graphical plot of the mode-field radius of a typical optical fiber waveguide as a function of the normalized index differential.

The effect of such variation can be seen by reference to FIG. 2 which is a graphical plot of the mode-field radius of a typical waveguide fiber 10 as a function of the normalized index differential $\Delta$. Preferably the normalized index differential of waveguide 10 at the point where waveguide 10 receives input from component 11 is at a value corresponding to the mode-field radius of component 11, e.g., if the mode-field radius of component 11 is 5 $\mu$m, the normalized index differential is about 0.35%. Similarly, if the mode-field radius of component 12 at the output is 3 $\mu$m, the normalized index differential at the output of waveguide 10 is about 0.85%. Advantageously, the normalized index differential of waveguide 10 varies from the value at 11 to that at 12 in a monotonic and preferably linear fashion.

Figure 3:
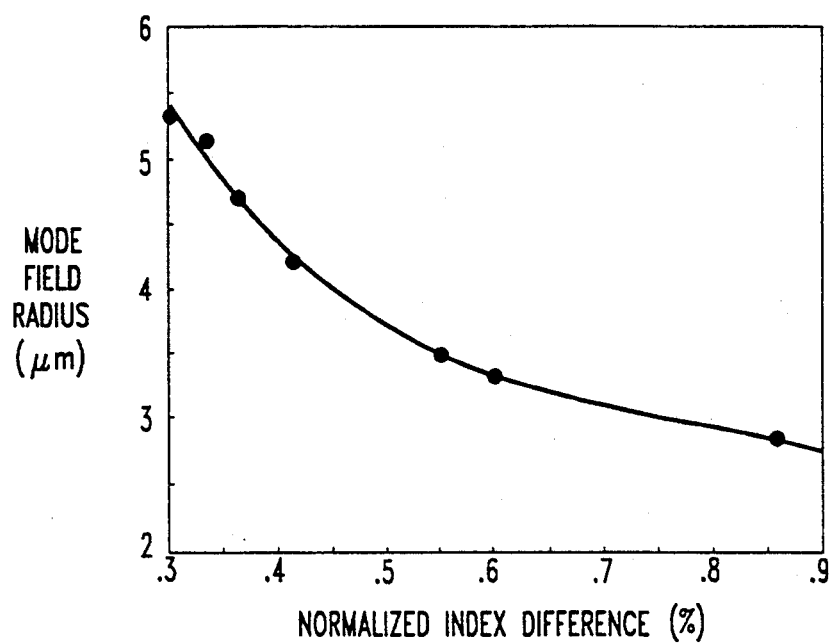
FIG. 3 is a graphical plot of the normalized index differential for a typical hydrogen-loaded optical fiber as a function of exposure time to a pulsed excimer laser.

The preferred method for varying the index differential as a function of longitudinal distance x is to use a waveguide having a photosensitive core, such as hydrogen-loaded germanosilicate glass, and to photooptically generate different index differentials for different values of x. For example, conventional communications-grade optical fibers can be loaded with molecular hydrogen at pressures in the range 130–700 atm and at temperatures of 21°–100° C. As a specific example, $H_2$ was diffused into AT&T Accutether fiber for 11 days at 283 atm and 35° C., resulting in a hydrogen concentration of 2.8 mole percent. Several fiber sections were then irradiated with ultraviolet light (247 nm) from a KrF excimer laser. The output energy density of the laser was 250 mJ/cm$^2$ with pulses of 10 ps duration impinging on the fiber at 20 Hz. FIG. 3 shows the peak normalized index differential $\Delta$ as a function of time of exposure. A similar index variation can be induced in hydrogen-loaded germanosilicate glass by exposure to infrared radiation from a $CO_2$ laser. In general, A varies in joint proportion to dosage of exposure, i.e., the product of intensity of exposure and time of exposure.

Using FIG. 3 as a calibration curve, mode-field transforming fibers were then fabricated from the hydrogen-loaded fiber. One end of a fiber section was wrapped around a cylinder fixed on a rotation stage while the other end was attached through a pulley to a counterweight. A section of the fiber a few millimeters long was exposed to the excimer radiation for 60 minutes. The stage was then rotated to place an adjacent section of the fiber in line with the laser radiation, and this section was exposed 45 minutes. The process was continued until a uniformly decreasing index change was achieved over a fiber length of 50 min. The mode-field radius was reduced from 5.3 $\mu$m to 2.85 $\mu$m over the 50 mm length. The fiber with the high-index differential at one end now permits the propagation of the higher order $LP_{11}$ mode. As a result, the mode-field transforming section can be used to connect a two-mode fiber to a single mode fiber.

It should be noted that an alternative method of making the same type of structure is to use a germanosilicate cladding and a germanium-free glass core. Exposure of the cladding will then reduce the index differential.

Applicant has thus disclosed a new type of mode-radius transforming waveguide that does not require diameter-tapering or other variation of physical dimensions. It is contemplated that the transforming waveguide will be most useful in applications where simple connections by means of connectors or epoxy bonds are sufficient. Fusion splicing may result in reduction of the light induced index changes.

It is to be understood that the above-described embodiments are illustrative of only a few of the many possible specific embodiments which can represent applications of the principles of the invention. For example, while the invention has been illustrated with optical fiber waveguides, planar waveguides could be used with equal advantage. Thus numerous and varied other arrangements can be made by those skilled in the an without departing from the spirit and scope of the invention.

I claim:

1. A waveguide structure for transforming an optical beam of a first modal spot size to a beam of a second modal spot size comprising:
   an elongated glass core having a pair of ends, wherein said glass core comprises germanosilicate glass;
   a cladding glass peripherally surrounding said core;
   said core having an index of refraction greater than that of said cladding and the normalized index differential between the core and the cladding monotonically increasing from one end of said structure to the other end.

2. A waveguide structure for transforming an optical beam of a first modal spot size to a beam of a second modal spot size comprising:
   an elongated glass core having a pair of ends, wherein said glass core comprises hydrogen loaded germanosilicate glass;
   a cladding glass peripherally surrounding said core,
   said core having an index of refraction greater than that of said cladding and the normalized index differential between the core and the cladding monotonically increasing from one end of said structure to the other end.

3. A waveguide structure for transforming an optical beam of a first modal spot size to a beam of a second modal spot size comprising:
   an elongated glass core having a pair of ends;
   a cladding glass peripherally surrounding said core, wherein said cladding comprises germanosilicate glass;
   said core having an index of refraction greater than that of said cladding and the normalized index differential between the core and the cladding monotonically increasing from one end of said structure to the other end.

4. An optical device comprising:
   a first optical component for transmitting a beam of light having a first optical spot size;
   a second optical component for receiving a beam of light and transmitting said beam at a second optical spot size different from said first optical spot size; and
   interconnecting said first and second components, a waveguide structure comprising an elongated glass core of germanosilicate glass having a pair of ends, cladding glass peripherally surrounding said core, said core having an index of refraction greater than that of said cladding and the normalized index differential between the core and the cladding monotonically increasing from one end of said structure to the other end.

5. A method for making a mode field transforming optical waveguide structure comprising the steps of:
   a) providing a waveguiding structure comprising germanosilicate glass;
   b) diffusing hydrogen into said germanosilicate glass;
   c) exposing the resulting structure to laser radiation of monotonically increasing or decreasing dosage along its length in order to produce a monotonically varying index differential between core and cladding along the length of the structure.

6. The method of claim 5 wherein said laser radiation is ultraviolet radiation.

7. The method of claim 5 wherein said laser radiation is infrared radiation.

8. The waveguide structure of claim 1 or 2 or 3 wherein said normalized index differential linearly increases from one end of the said structure to the other end.

* * * * *